United States Patent [19]

Storesund

[11] Patent Number: 5,149,294
[45] Date of Patent: Sep. 22, 1992

[54] PROCESSING MACHINE FOR BOILED/COOKED CRAB

[76] Inventor: Jan R. Storesund, Osthus, N-4276 Vedavåagen, Norway

[21] Appl. No.: 826,216

[22] Filed: Jan. 21, 1992

Related U.S. Application Data

[63] Continuation of Ser. No. 689,781, May 15, 1991, abandoned.

[30] Foreign Application Priority Data

Nov. 17, 1988 [NO] Norway .................................. 885125

[51] Int. Cl.⁵ .......................................... A22C 29/00
[52] U.S. Cl. ................................................... 452/10
[58] Field of Search ................................. 452/10, 1

[56] References Cited

U.S. PATENT DOCUMENTS

| | | | |
|---|---|---|---|
| 1,565,342 | 12/1925 | Umrath | 452/10 |
| 2,525,604 | 10/1950 | Johnson | 452/10 |
| 3,229,325 | 1/1966 | Amclang | 452/10 |
| 3,719,967 | 3/1973 | Craig | 452/10 |
| 4,286,356 | 9/1981 | Wenstom | 452/1 |
| 4,614,006 | 9/1986 | Lockieby et al. | 452/10 |
| 5,011,453 | 4/1991 | Lapeyre et al. | 452/10 |

FOREIGN PATENT DOCUMENTS 594129 9/1951 Canada .................................. 452/10
1380964 10/1964 France .
2192771 2/1974 France .

*Primary Examiner*—Willis Little
*Attorney, Agent, or Firm*—Hill, Van Santen, Steadman & Simpson

[57] ABSTRACT

A processing machine particularly for boiled/cooked crab including a shell crusher (2) and a subsequent separator in which the crab meat is separated from the shell fragments. The separator of the machine includes a plurality of upright, spinning, screw-threaded spindles (12). These spindles are arranged in a circle in a spinning meat collection tray (13) for crab meat with just sufficient clearance between adjacent spindles that the crab medium which is discharged into the circular space defined by the spindles (12) in the spinning meat collection tray (13) is pressed, by centrifugal force, out against the spindles (12), where it can pass between the adjacent spindles (12), while almost the entire bulk of hard shell fragments are prevented from passing between the spindles (12). The pitch of the screw threads of the spindles and their directions of rotation combine to move the shell fragments upward and into an overlying shell collection tray (10), while the crab meat makes its way to the outer portion of the rotary meat collection tray (13) confining the ring of spindles (12).

2 Claims, 2 Drawing Sheets

PROCESSING MACHINE FOR BOILED/COOKED CRAB

This is a continuation of application Ser. No. 689,781, filed May 15, 1991 now abandoned.

BACKGROUND OF THE INVENTION

1. Field Of The Invention

This invention relates to a processing machine for boiled crab, lobster and other crustacean comprising a shell crushing means and a subsequent separation means in which the meat is separated from the shell fragments, at least partially, through a centrifugal force effect, said separation means comprising a rotary tray adapted to be supplied with a mixture of meat and shells and wherein a number of upright (vertical or steeply inclined) separation-wall-defining adjacent members are arranged along the path of a closed ring, the spacing therebetween being such that meat may penetrate, but where almost all the hard shell fragments are unable to pass between said adjacent members, the separated meat being collected within an annular space externally of said adjacent members.

2. Description Of The Prior Art

A number of crab processing and similar machines are known in the art for the manufacture of a processed product comprising crab meat or similar meat, for example meat of lobster or other crustacean.

One crab processing machine known in the art utilises a separation operation based on centrifugal techniques. This machine comprises a centrifuge the design of which is only intended to separate/cleanse the carapace (or "main body") of the shell. However, since separation is desirable, not only of the carapace, but also the major appendages (claws) and minor appendages (legs) in one and the same separation operation, this known machine is of limited application. Its processing capacity is also small, and the operation of the machine requires considerable manual effort.

Another crab processing machine known in the art utilises water jets to separate the crab meat from the shell fragments. The water consumption of this machine is so great that the aromatic components of the crab meat are diluted by the rinse water and may even dissolve in it. After going through this separation operation the crab has therefore lost such a considerable portion of its natural and characteristic aroma and taste that a special crab concentrate must be added, a step which generally impairs the meat's quality—including its taste quality—as the crab meat after addition of the concentrate has a "watery" or bland taste. This known machine, too, is dependent for its operation on considerable manual labour since it takes several persons to work it.

From U.S. Pat. No. 3,266,542 is known a machine which is designed to separate fragments of bone, cartilage and sinew from finely ground meat. This known machine with its relatively complex design is set up for the processing of very finely ground meat of fowl, domestic animals or fish, and imparts an even finer grinding to the meat during processing. This additional finegrinding operation is undesirable in the case of crab meat. Also, this known machine is far too complicated for application to the present purpose.

U.S. Pat. No. 3,266,543 discloses a machine which structurally and functionally differs only in minor details from the machine disclosed in U.S. Pat. No. 3,266,542.

The U.S. Pat. No. 1,565,342 shows a low-capacity domestic appliance for the shelling of crustacea, comprising a rotary container, and wherein the separation means for separating meat from shells is formed by a number of pins (8) arranged along the path of a closed ring, the spacing there-between being such that the meat may penetrate whereas the thicker shell fragments are prohibited from entering in between said pins. Said pins have no self-motion, i.e. they rotate together with the container, but they are stationary in relation to said container.

It appears from the specification of this patent that the shells are removed from the appliance in an extremely cumbersome way. Such an appliance has, therefore, a very low capacity as compared with a device having the same dimensions but being constructed in accordance with the present application.

The U.S. Pat. No. 3,229,325 discloses a very similar construction, but the function is quite different. While the present invention and the one according to U.S. Pat. No. 1,565,342 work on an intimate mixture of crab meat and shell fragments, the machine according to U.S. Pat. No. 3,229,325 operates with holders for large crab pieces wherein the meat is contained within the associated shell portions (see specification and especially FIGS. 2, 4 and 5). After the crab meat has been separated from its associated shell piece by centrifugal force effect, said shell piece will remain within its holder means, wherefrom it subsequently must be removed individually. This limits the capacity of this known domestic appliance substantially. The shelling operation of this known device is restricted to shell pieces containing meat wherein access to all contained meat has been made available previously. A crab carapace must, therefore, in order to enable appropriate processing in a machine of this known kind, be cut open in all directions, and then it will probably, paradoxically, be quite unfit for this prior art separation operation.

SUMMARY OF THE INVENTION

The objective of the present invention is to overcome the drawbacks of the known art and thereby provide a processing machine for the stated purpose which leaves the crab meat with its taste and aroma components intact after the processing operation, being a machine having large capacity relative to its size and space requirements, and for which the requirement for human intervention is generally limited to the feeding of the machine with boiled crab in the form of claws, minor appendages and "body shell/carapace". The separation operation must in addition be so effective that the crab meat subsequent to processing is completely or substantially uncontaminated by shell fragments.

This objective is realised in the processing machine for boiled crab, lobster and other crustacea comprising a shell crushing means and a subsequent separation means in which the meat is separated from the shell fragments, at least partially, through a centrifugal force effect, the separation means comprising a rotary tray adapted to be supplied with a mixture of meat and shells and wherein a number of upright (vertical or steeply inclined) separation-wall-defining adjacent members are arranged along the path of a closed ring, the spacing therebetween being such that meat may penetrate, but where almost all the hard shell fragments are unable to pass between the adjacent members, the separated meat being collected within an annular space externally of the adjacent members, characterized in that the upright separation-wall-defining members are constituted by rotary screw-threaded spindles, the screw-thread gradient and direction of rotation of the spindles being deliberately selected so as to promote an upward twisting, motion of separated shell fragments into an overlying shell collection tray, the separated meat making its way to the outer periphery of the meat/shell-mixture-receiving rotary tray, externally of the spindles.

BRIEF DESCRIPTION OF THE DRAWINGS

In one preferred embodiment of the crab processing machine considered below, which serves to illustrate the invention without being intended to limit its scope, reference is made to the figures enclosed, in which:

FIG. 1 is a side elevation with cut-away views showing the crab processing machine complete, while;

DETAILED DESCRIPTION OF THE PREFERRED EMBODIMENTS

Figure 1:
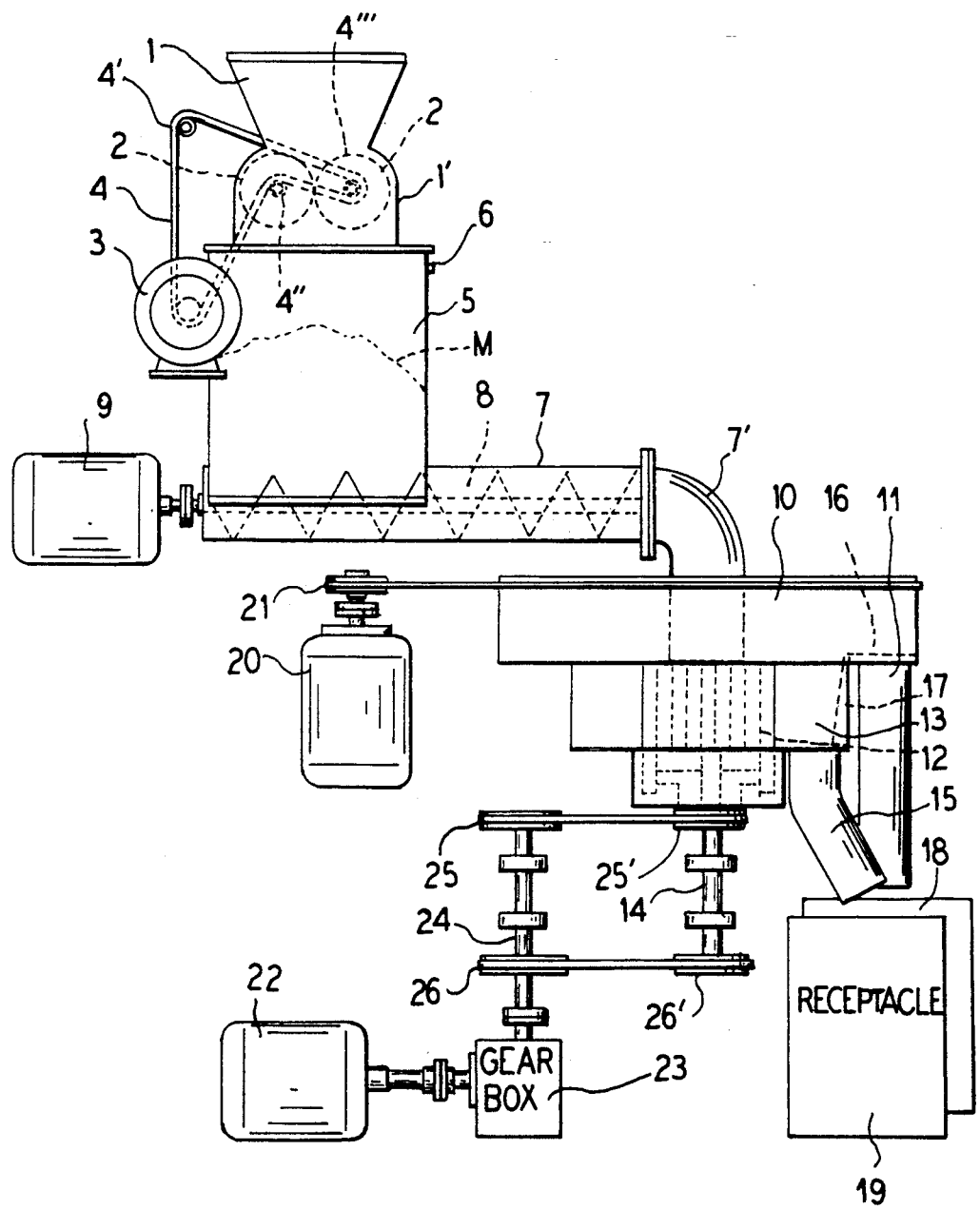

The crab processing machine depicted in the drawings comprises a feed hopper 1, which is supplied—for example from a conveyor belt (not shown)—with boiled crab in the form of claws, minor appendages and carapaces. At the bottom of the feed hopper 1 is a widened portion 1' in which two co-operating crushing rollers 2 are provided. Serving to drive the crushing rollers 2 in opposite directions is a first drive motor 3, preferably electrically powered, which turns the crushing rollers 2 by means of a chain drive comprising chain 4 and sprockets 4', 4" and 4'".

Once the crab medium M consisting essentially of a mixture of crab or other crustacea meat and shell fragments has passed through the shell crusher 2 it emerges into the underlying container 5. Near the top of this container 5 is provided a photoelectric cell 6 the purpose of which is to give a signal whenever the container is becoming too full. This undesirable circumstance might result if the feed rate is too great relative to the separation capacity of the machine. Once the container 5 fills to the level sensed by the photoelectric cell 6, the photoelectric cell signals—through a transmission path, not shown—cause the rotation of the crushing rollers to cease. This level regulation system is so arranged that the crushing rollers 2 are again set in rotation once the level in the container 5 has subsided to below the level sensed by the photoelectric cell 6.

Connected to the bottom of the container 5 is a horizontal pipe 7 in which is installed a transport auger (feed screw) 8 which is driven round by means of a second electric motor 9. This transport auger 8 has a dual purpose; firstly the purely transportive purpose of implementing the feed operation into the machine's separation means, secondly an aeration, or loosening function by which the crab medium is aerated or broken up, reducing the adhesion of the crab meat to the shell fragments. As a result the separation means is supplied with crab medium of lighter (airier) consistency, thereby serving to facilitate the subsequent special separation process of the invention.

The transport pipe 7 is furnished at its outward end with a pipe bend 7' which extends through the center of a spinning shell collection tray 10 for shell fragments and waste. This shell collection tray 10 is furnished with a peripherally located discharge pipe 11. The pipe bend 7' empties just above the separation means.

The separation means comprises a plurality of spinning, screw-threaded spindles 12 which, in the exemplary embodiment considered herein are vertically oriented, but which in alternative embodiments can be oriented at an angle having a steep slope. These spindles 12, being a plurality—say sixteen—of spindles, are deployed in a ring in the spinning meat collection tray 13 the tray 13 being driven by a main shaft 14. The bearings and drive particulars of a single such spindle 12 are shown in detail in FIG. 2, described later. Note for now that the spindles 12 are driven through a gear reduction by the underlying main shaft 14 which can rotate along with tray 13 at a speed of, say, 1800 revolutions a minute; causing each spindle to rotate at, say, 700 revolutions a minute.

As the crab medium drops into the generally round space defined by the spindles 12 in the meat collection tray 13, the medium is flung radially outward against the spindles 12 by the spinning of the meat collection tray 13. The spindles are deployed with a mutual separation distance (to be determined by experiment) which permits only the pliant crab meat to pass through the space between adjacent spindles. The crab shell fragments on the other hand are too big, and furthermore also too hard, to be squeezed and passed between the spindles. The screw-thread orientation of the spindles and their direction of rotation impart an upward twisting motion, meaning that they drive the shell fragments upward, and as these separated shell fragments reach the top ends of the spindles, they collect in the spinning shell collection tray 10, whereupon they are flung outward to the tray periphery and tumble down the discharge pipe 11. Once the crab meat has passed between the spindles and, consequently, been relieved of its shell fragments, it migrates to the periphery of the spinning meat collection tray 13 within which is deployed the ring of spindles 12. The meat collection tray 13 is likewise furnished with a discharge pipe 15.

In order to facilitate the migration of shell fragments and crab meat to their respective discharge pipes 11 and 15, the respective spinning collection trays 10 and 13 can be fitted with suitably shaped stationary baffles, respectively 16 and 17, for example made of rubber.

Under the discharge pipes 11, 15 from the collection trays 10, 13 may be placed receiving receptacles, respectively 18 and 19, which may alternatively be replaced by conveyor belts (not shown).

The upper collection tray 10 for shell and waste is caused to rotate by means of a third electric motor 20 via a toothed belt or chain drive 21.

A fourth electric motor 22 turns an intermediate shaft 24 running parallel to the main shaft 14 through a helical drive gearbox (whose casing is denoted 23); said parallel intermediate shaft 24 causing via two parallel drives, being either toothed-belt-and-pulley drives or chain-and-sprocket drives 25, 26 the rotation of the main shaft 14 (lower parallel drive) and sun gear assembly (upper parallel drive). The driven toothed belt drive pulleys, or driven chain drive sprockets, are denoted 25' and 26'.

Figure 2:
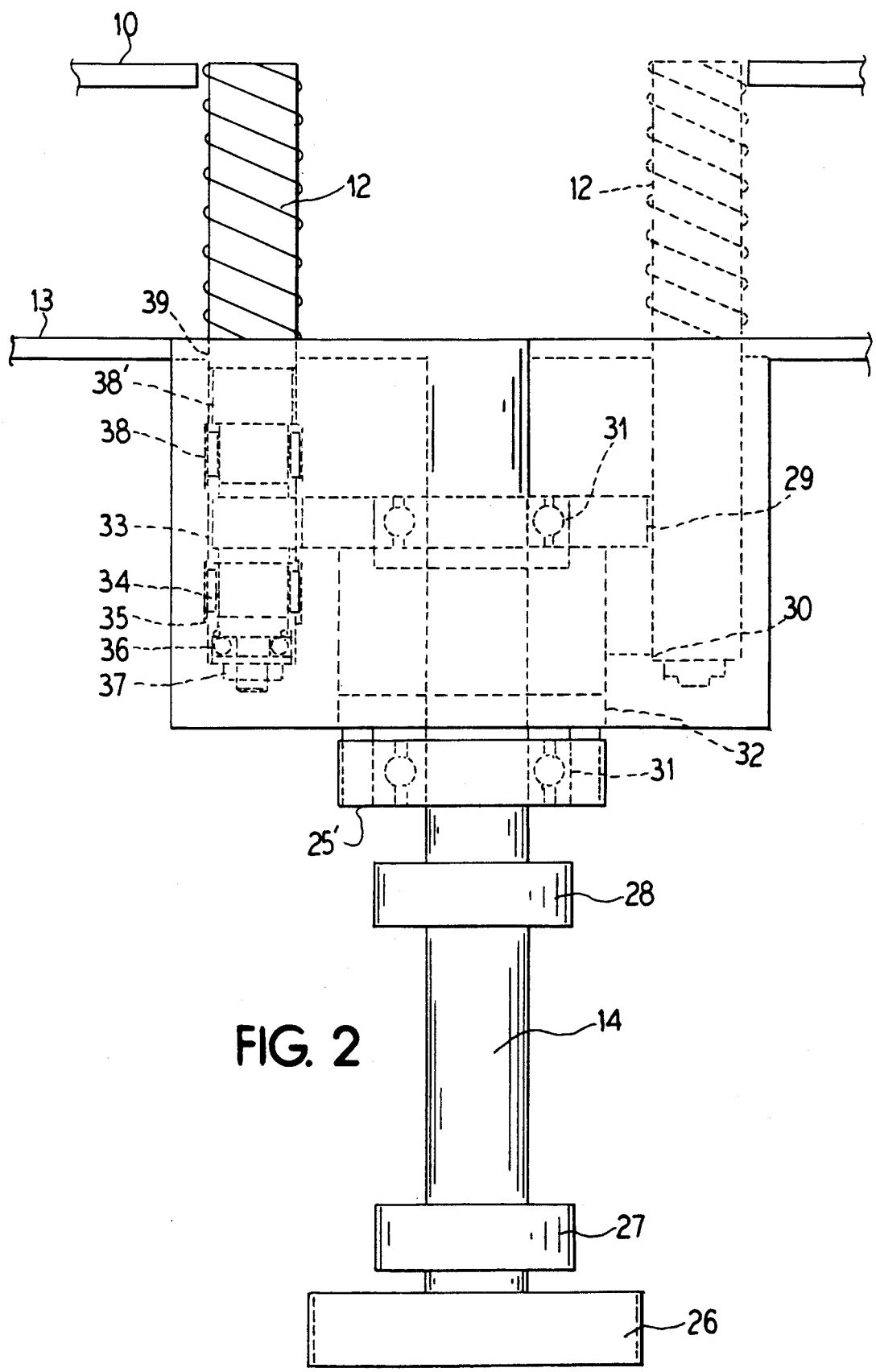
FIG. 2 shows in larger scale the separation means of the processing machine separately, again in a side view.

The separation means of the crab processing machine, or more exactly the drive and bearing particulars of the spindles 12 and their main shaft 14, are illustrated in greater detail in FIG. 2 in which only one spindle 12 is shown in detail while a second spindle is shown in phantom the other spindles having similar drive and bearing arrangements.

The bearings of the main shaft 14 are indicated schematically by numbers 27 and 28.

The upper toothed belt pulley 25' and, above it, a sun gear 29 of larger diameter form an integral unit (the sun gear assembly) by virtue of a connector sleeve 30, and are (rotatably) mounted on the main shaft 14 by means of two ball bearings 31 and 31'. Reference numeral 32 denotes an oil seal (simmer) ring.

In order to turn the spindle 12, said spindle 12 is provided with a planetary gear 33 of substantially smaller diameter than the central sun gear 29 with which it meshes. The spindle 12 is supported below planetary gear 33 by, in downward order: needle bearing 34, retainer (seeger) ring 35, axial (thrust) ball bearing 36 and securing nut 37. The spindle 12 is supported above planetary gear 33 by, in upward order: two axially mounted needle bearings 38 and 38' and a top oil seal (simmer) ring 39.

As already noted, the toothed belt pulley 25' and the central sun gear 29 are (rotatably) mounted on the main shaft 14 by means of two ball bearings 31, 31'. Consequently the central sun gear 29 rotates freely on the main shaft 14, permitting the speed of revolution of the spindles 12 to be regulated by varying the diameter of the toothed belt pulley 25'.

The axial ball bearing, needle bearings and sun and planetary gear sets 29, 33 should preferably run in an oil bath. In order to diminish the nutritional hazards associated with oil leaks a favourable choice of oil would be soya oil, for example.

In order to facilitate cleaning of the machine, steam jets or similar (not shown) can be incorporated. Any such cleaning devices are outside the realm of this invention, concerning as it does principally the crab processing machine's crab separation facility comprising the rotating spindles 12 deployed in a ring. The actual perimeter shape of the "ring" defined by the mutually adjacent and co-operating spindles is not critical, but for reasons of symmetry, practical realisations will generally invoke a layout which, in plan, features generally circular deployment of the spindles, which besides should make it easier to transmit power to the spindles by means of gearing. This advantage notwithstanding, the invention is not to be construed as being limited to geared transmissions to rotate the spindles 12.

Although other modifications and changes may be suggested by those skilled in the art, it is the intention of the inventor to embody within the patent warranted hereon all changes and modifications as reasonably and properly come within the scope of his contribution to the art.

I claim:

1. A processing machine for crustacea and the like, comprising:

a shell crushing means for crushing shells of the crustacea; and a subsequent separation means disposed to receive meat and shell fragments from said shell crushing means for separating the meat from the shell fragments, at least partially, through a centrifugal force effect, said separation means comprising:

a first tray with a rotary floor disposed to receive in an inner area a mixture of meat and shells from said shell crushing means;

means for rotating said rotary floor of said first tray;

a shell collection tray overlying said first tray;

a number of upright separation-wall-defining adjacent members are arranged along a path of a closed ring to separate said first tray into the inner area and an outer periphery, spacing between said adjacent members being such that meat may penetrate, but where almost all the hard shell fragments are unable to pass between said adjacent members, separated meat being collected within the outer periphery externally of said adjacent members, said upright separation-wall-defining adjacent members being rotary screw-threaded spindles having a screw-thread pitch; and means for rotating said adjacent members in a direction of rotation of said spindles being deliberately selected so as to promote an upward twisting motion of separated shell fragments into said overlying shell collection tray, the separated meat making its way to the outer periphery of the said first tray externally of said spindles.

2. A processing machine as claimed in claim 1, further comprising:

a transport means for transporting a mixture of meat and shells from the shell crushing means to the separation means; said transport means comprises a generally horizontal pipe housing a means for aerating and breaking up said mixture of meat and shells to facilitate an initial separation of the meat from the shells, said means for aerating and breaking up being a rotary transport auger, and a pipe bend connected at an end of said generally horizontal pipe and extending downward through a center of said shell collection tray, said pipe bend having a discharge opening just above a space defined internally by said spindles in said rotary tray;

said shell collection tray being rotatably mounted; and means for rotating said shell collection tray.

* * * * *